United States Patent [19]
Lee et al.

[11] Patent Number: 5,960,120
[45] Date of Patent: Sep. 28, 1999

[54] APPARATUS FOR QUANTIZING CLASSIFIED VECTORS OF IMAGE SIGNALS USING FOUR-BAND LINEAR PHASE PARA-UNITARY FILTER GROUP

[75] Inventors: Chang-Woo Lee, Anyang; Sang-Uk Lee, Seoul, both of Rep. of Korea

[73] Assignee: Samsung Electronics Co., Ltd., Kyungki, Rep. of Korea

[21] Appl. No.: 08/791,142

[22] Filed: Jan. 30, 1997

[51] Int. Cl.$^6$ .............................. G06K 9/36; G06K 9/46; G06K 9/38

[52] U.S. Cl. .......................... 382/253; 382/232; 382/248; 382/251

[58] Field of Search ..................................... 382/251, 253, 382/248, 232; 348/403, 422, 420, 437, 438, 384, 387, 395, 398, 400, 408; 358/426, 261.2, 261.3, 430, 432, 433

[56] References Cited

U.S. PATENT DOCUMENTS 5,533,138 7/1996 Kim et al. ................................. 382/232
5,561,464 10/1996 Park ........................................ 348/397

OTHER PUBLICATIONS

Y. Huh et al. "Classified Wavelet Transform Coding of images using Two–Channel Conjugate Vector Quantization", Proceedings of 1st International Conference on Image Processing, Nov. 13–16, 1994, IEEE Comput. Soc. Press, vol. 3, pp. 363–367.

Y. Huh et al. "Classified Wavelet transform Coding of Images Using Vector Quantization", SPIE, 2308, Sep. 1994, pp. 207–213.

B.Ramamurth and A.Gersho "Classified Vector Quantization of Images", IEEE Transactions on Communications, vol. COM–34, No. 11, Nov. 1986, pp. 1105–1115.

Primary Examiner—Bijan Tadayon
Assistant Examiner—Dmitry A. Novik
Attorney, Agent, or Firm—Sughrue, Mion, Zinn, Macpeak & Seas, PLLC

[57] ABSTRACT

An apparatus for vector-quantizing an image signal having a low transmission rate which includes a four-band linear filter para-unitary (LPPU) filter group for transforming an input image signal into transform coefficients which are represented by 4×4 frequency bands. A code modulator differential-pulse-code-modulates a direct current (DC) component among the transform coefficients output from the four-band LPPU filter group. A coefficient extractor extracts a predetermined number of low-frequency alternating current (AC) component coefficients from the transform coefficients output from the four-band LPPU filter group. A classifier determines a corresponding class, from a plurality of predetermined classes, using the low-frequency AC component coefficients extracted by the coefficient extractor, and outputs class information representing the determined class. A classified vector quantizer quantizes classified vectors of corresponding AC component coefficients input from the coefficient extractor according to the class information output from the classifier and outputs block position information, corresponding to an image block having a predetermined size, of a block matching the transform coefficients transformed by the four-band LPPU filter group, together with the classified-vector-quantized image data and the corresponding class information when the class information does not represent a particular class among the plurality of the predetermined classes, and outputs the classified-vector-quantized image data and the corresponding class information when the class information represents the particular class.

39 Claims, 4 Drawing Sheets

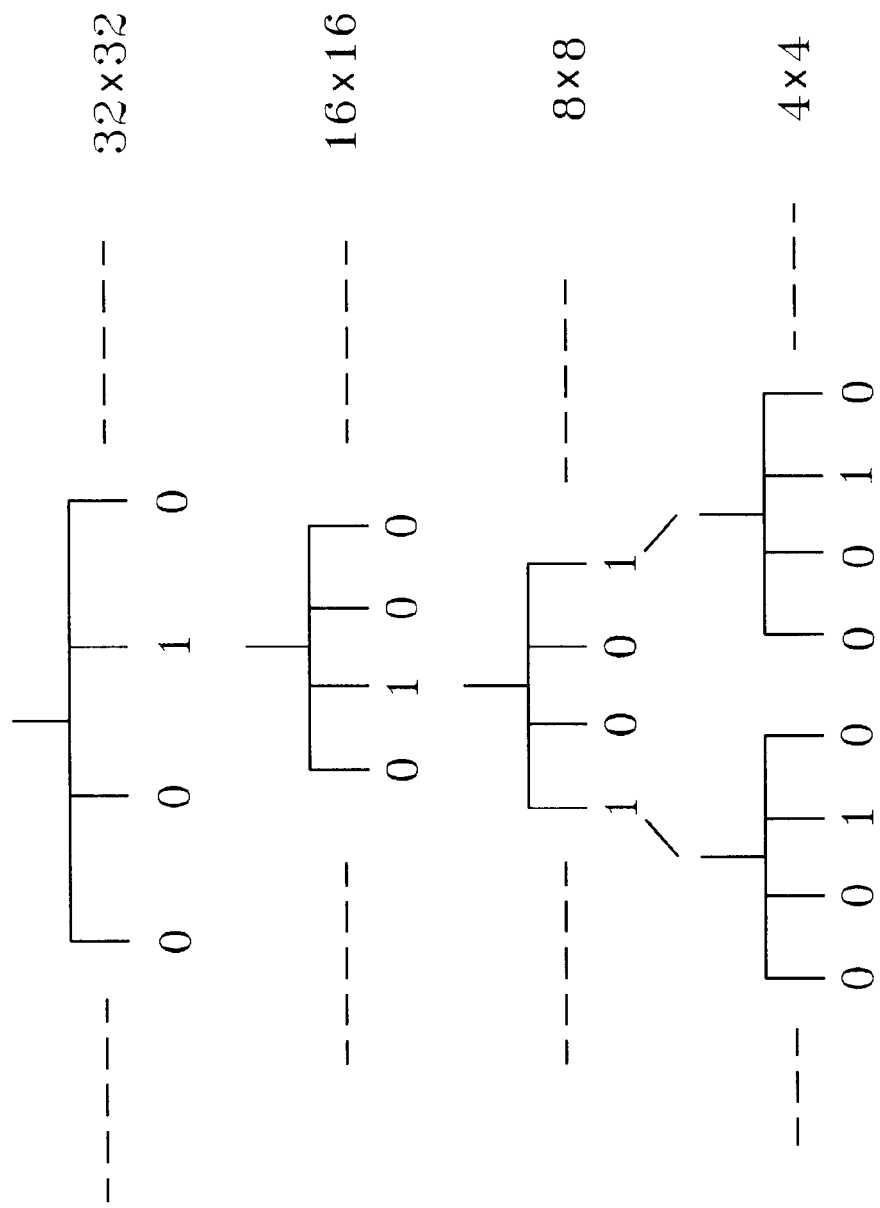

APPARATUS FOR QUANTIZING CLASSIFIED VECTORS OF IMAGE SIGNALS USING FOUR-BAND LINEAR PHASE PARA-UNITARY FILTER GROUP

BACKGROUND OF THE INVENTION

The present invention relates to an apparatus for quantizing a classified vector of a video signal, and more particularly, to an apparatus for efficiently quantizing a classified vector of an image signal having a low transmission rate.

The use of a vector quantizer to enhance encoding efficiency when an image signal is encoded at a low encoding ratio is presently being studied. An existing vector quantizer uses a correlation between vectors to obtain an encoding gain which is greater than that obtained with a scalar quantizer. However, when such a vector quantizer is used, distortion occurs at the edge portion of the image.

A classified vector quantizer is used to obviate such a defect. To accomplish the substantial elimination of distortion, image data of a spatial domain is converted into transform coefficients of a frequency domain or a transform domain through a discrete cosine transform operation which is performed in units of 8×8 blocks. Each block partitioning an image is classified into various classes according to edge components of the image. The classified vector quantizer quantizes an image signal using vectors partitioning 8×8 blocks of a frequency domain and a code book designed to be appropriate for various classes of blocks.

The aforementioned existing classified vector quantizer quantizes classified vectors of the transform coefficients obtained by using a discrete cosine transformation. As a result, an image signal having a low transmission rate brings about blocking effects in which a boundary portion between the blocks is displayed. Also, a product code is used to reduce the amount of data required for representation of vectors partitioning the 8×8 blocks, which requires a complicated structure of the classified vector quantizer.

SUMMARY OF THE INVENTION

To solve the above problem, it is an object of the present invention to provide an apparatus for efficiently quantizing vectors of an image signal at a low transmission rate.

To accomplish the above object of the present invention, there is provided an apparatus for vector-quantizing an image signal which comprises a four-band linear filter para-unitary (LPPU) filter group for transforming an input image signal into transform coefficients which are represented by 4×4 frequency bands, code modulation means for differential-pulse-code-modulating a direct current (DC) component among the transform coefficients output from the four-band LPPU filter group into differential pulse codes, coefficient extraction means for extracting a predetermined number of low-frequency alternating current (AC) component coefficients among the transform coefficients output from the four-band LPPU filter group, classification means for determining a corresponding class of the image data represented by the 4×4 frequency bands, among a plurality of predetermined classes, using the low-frequency AC component coefficients extracted by the coefficient extraction means, and for outputting class information representing the determined class, and classified vector quantization means for quantizing classified vectors of corresponding AC component coefficients input from the coefficient extraction means according to the class information output from the classification means. The classified vector quantization means outputs block position information, corresponding to an image block having a predetermined size, of a block matching the transform coefficients transformed by the four-band LPPU filter group, together with the classified-vector-quantized image data and the corresponding class information when the class information does not represent a particular class among the plurality of the predetermined classes. The classified vector quantization means outputs the classified-vector-quantized image data and the corresponding class information when the class information represents the particular class.

There is also provided an apparatus for vector-quantizing an image signal which comprises, a four-band linear filter para-unitary (LLPU) filter group for transforming an input image signal into transform coefficients which are represented into 4×4 frequency bands, code modulation means for differential-pulse-code-modulating a direct current (DC) component among the transform coefficients output from the four-band LPPU filter group into differential pulse codes, coefficient extraction means for extracting a predetermined number of low-frequency alternating current (AC) component coefficients among the transform coefficients output from the four-band LPPU filter group, classification means for determining a corresponding class of the image data represented by the 4×4 frequency bands, among a plurality of predetermined classes, using the low-frequency AC component coefficients extracted by the coefficient extraction means, and for outputting class information representing the determined class, classified vector quantization means for quantizing classified vectors of corresponding AC component coefficients input from the coefficient extraction means according to the class information output from the classification means, and means for multiplexing the differential-pulse-code-modulated data output from the code modulation means, the classified-vector-quantized image data output from the classified-vector-quantizing means, and the class information output from the classification means and for outputting the multiplexed result.

BRIEF DESCRIPTION OF THE DRAWINGS

The preferred embodiments of the present invention are described with reference to the accompanying drawings wherein:

FIG. 4 is a conceptual diagram for explaining generation of block position information using a quad-tree technique.

DETAILED DESCRIPTION OF PREFERRED EMBODIMENTS OF THE INVENTION

Preferred embodiments of the present invention will be described in detail with reference to the accompanying drawings.

Figure 1:
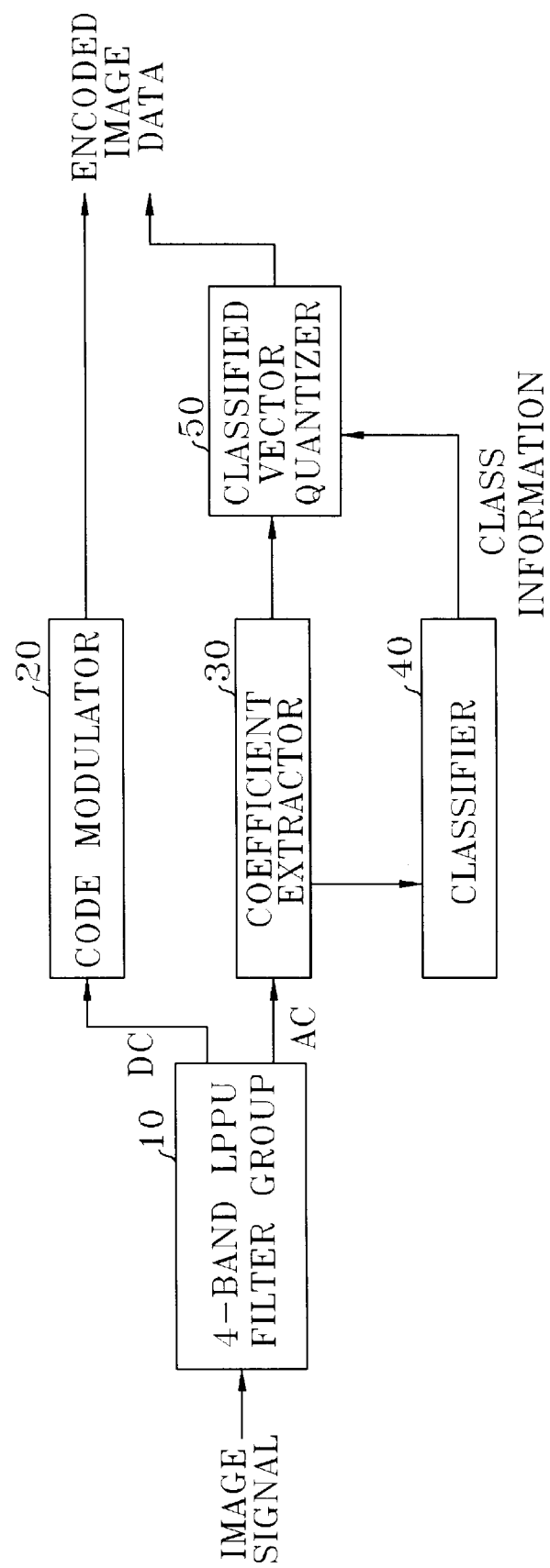
FIG. 1 is a block diagram showing a classified vector quantization apparatus according to a preferred embodiment of the present invention.

An apparatus shown in FIG. 1 according to the present invention includes a four-band linear phase para-unitary (LPPU) filter group 10 for receiving an image signal having a low transmission rate. The four-band LPPU filter group 10 has thirty-two taps and transforms the input image signal into transform coefficients which are represented as 4×4 frequency bands. The transform coefficients are obtained by using the image signal ot the adjacent 4×4 blocks in the spatial domain. Since the method for producing the transform coefficients by the four-band LPPU filter group 10 is well-known to those skilled in the art, a detailed description of the method is omitted.

The four-band LPPU filter group 10 supplies a DC component coefficient among the transform coefficients, which are represented by 4×4 frequency bands, to a code modulator 20, and supplies corresponding AC component coefficients among the transform coefficients to a coefficient extractor 30. The code modulator 20 two-dimensionally differential-pulse-code-modulates DC component coefficients input from the four-band LPPU filter group 10.

Figure 2:
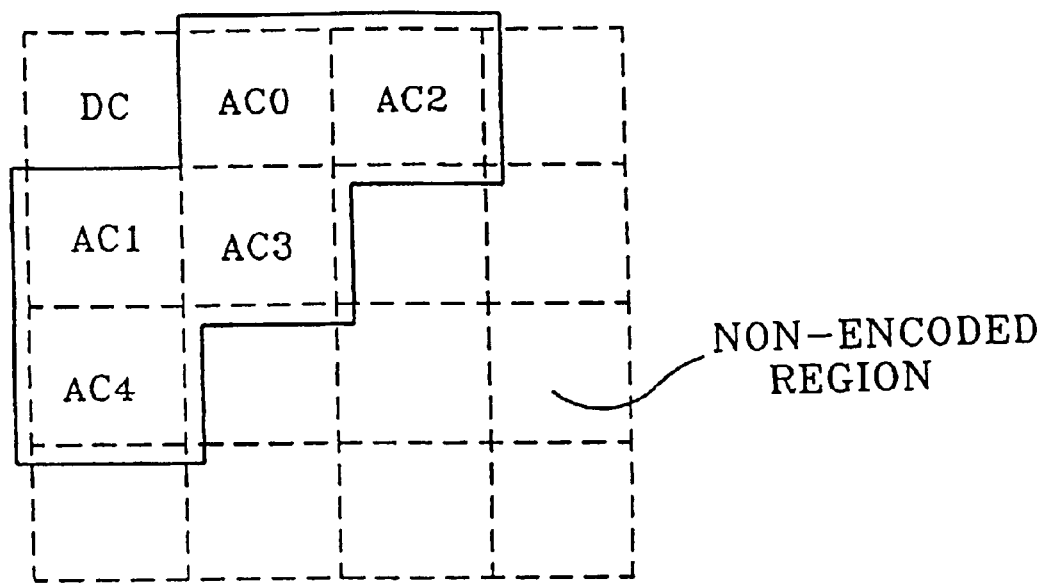
FIG. 2 is a conceptual diagram for explaining selection of coefficients to be quantized.

FIG. 2 shows transform coefficients to be quantized. In FIG. 2, reference characters "DC" and "AC0" through "AC4" represent a DC component and five low-frequency AC components. The coefficients of the DC component and the five low-frequency AC components assume 99.1% of the total energy possessed by the transform coefficients of the 4×4 frequency bands. Thus, the coefficient extractor 30, which receives the AC component coefficients output from the four-band LPPU filter group 10, uses a well-known zonal encoding method, to extract the five low-frequency AC component coefficients AC0–AC4. The extracted low-frequency AC component coefficients AC0–AC4 are input to a classified vector quantizer 50. The coefficient extractor 30 supplies the AC component coefficient AC0, having a minimum horizontal frequency, and the AC component coefficient AC1, having a minimum vertical frequency, to a classifier 40.

Figure 3:
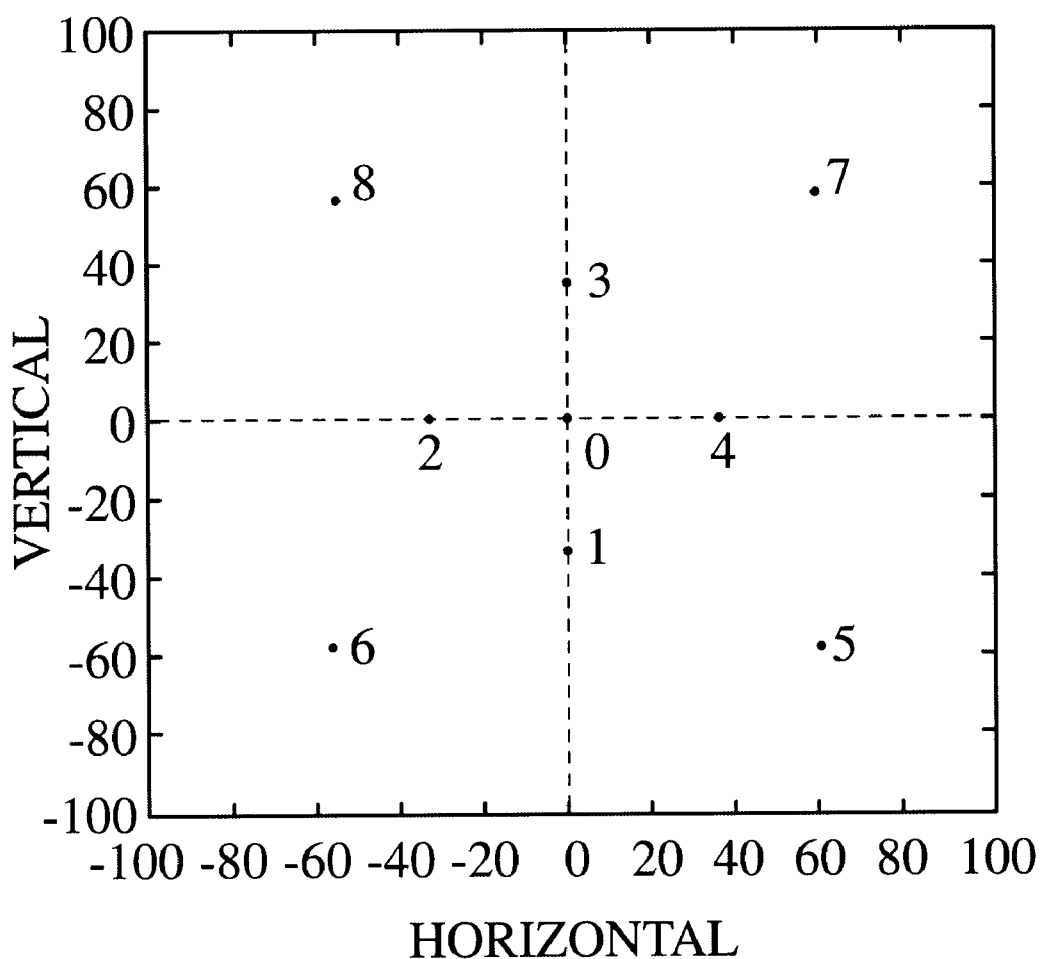
FIG. 3 is a conceptual diagram for explaining representative feature vectors in a two-dimensional feature vector region.

FIG. 3 is a conceptual diagram for explaining representative feature vectors in a two-dimensional feature vector region. A two-dimensional feature vector region shown in FIG. 3 is represented by a feature vector having the AC component coefficient AC0 having the minimum horizontal frequency as a horizontal component, and the AC component coefficient AC1 having the minimum vertical frequency as a vertical component. The numbers indicated in the two-dimensional feature vector region of FIG. 3 represent classes, in which each class has a corresponding representative feature vector which is represented in the two-dimensional feature region. The representative feature vectors are determined considering an edge degree and an edge direction of an image in the two-dimensional feature vector region, in which a known Linde-Buzo-Gray algorithm is used. The classifier 40 uses the low-frequency AC component coefficients AC0 and AC1, input from the coefficient extractor 30, to determine a feature vector. Then, the classifier 40 selects a representative feature vector which is closest to the determined feature vector among a plurality of the representative feature vectors, and outputs class information corresponding to the selected representative feature vector to the classified vector quantizer 50.

The classified vector quantizer 50 uses the class information input form the classifier 40 and classified-vector-quantizes corresponding AC component coefficients input from the coefficient extractor 30. To perform the classified vector quantization, the classified vector quantizer 50 uses a first quantization vector which is represented by two AC components whose frequencies are closer to that of the DC component, and a second quantization vector which is represented by three AC components whose frequencies are farther from that of the DC component. The first quantization vector is represented by the frequency components AC0 and AC1 of FIG. 2 and the second quantization vector is represented by the frequency components AC2, AC3 and AC4.

FIG. 4 is a conceptual diagram for explaining generation of block position information using a quad-tree technique. A 4×4 block requires a greater amount of class information, compared with an 8×8 block, to inversely quantize the classified-vector-quantized data. However, in the case of nine classes shown in FIG. 3, the class indicated by "0" assumes 60% of the total frequencies of occurrence of the classes. Thus, in the present invention, the class indicated by "0" is not assigned with class information, and the other classes are assigned with additional information such as block position information and class information.

The classified vector quantizer 50 generates block position information representing a position possessed by an individual 4×4 block. A well-known quad-tree technique is used to find a 4×4 block which requires class information. The quad-tree technique starts at a 32×32 block partitioning of an image. With respect to each 32×32 block, if 64 4×4 blocks arc all classes indicated by "0", a corresponding quad-tree node is assigned a value of "0", and if at least one of the 64 4×4 blocks is not a class indicated by "0", a corresponding quad-tree node is assigned a value of "1". Then, with respect to four 16×16 blocks constituting a 32×32 block which is assigned a value of "1" a corresponding quad-tree node is assigned a value "0" or "1" in the same manner as that of the 32×32 block. This finding operation is performed to a 4×4 block level. The classified vector quantizer 50 outputs the classified-vector-quantized data, the corresponding class information and the corresponding block position information with respect to an individual 4×4 block having a class which is not "0". Only the classified-vector-quantized data is output with respect to the individual 4×4 block having a class indicated by "0".

A variable length encoder is used to more efficiently encode the data encoded by the FIG. 1 apparatus. One variable length encoder variable-length-encodes the two-dimensionally differential-pulse-code-modulated data output from the code modulator 20, and another variable length encoder variable-length-encodes the data output from the classified vector quantizer 50.

The above-described FIG. 1 apparatus can be modified so that the classified-vector-quantized data corresponding to the 4×4 block is transmitted together with the corresponding class information representing a class which is "0". In this case, a multiplexer (not shown) multiplexes the outputs of the code modulator 20, the classifier 40 and the classified-vector-quantizer 50. More particularly, the multiplexer adds class information corresponding to the classified-vector-quantized data to overhead data.

As described above, the apparatus for vector-quantizing an image signal according to the present invention remarkably reduces blocking effects with respect to image signals having low transmission rates when compared with devices using a discrete cosine transformation method. Also, the apparatus according to the present invention obtains a higher encoding gain when compared with that of the Joint Picture Experts Group (JPEG) which is a still image encoding standard.

While only certain embodiments of the invention have been specifically described herein, it will apparent that numerous modifications may be made thereto without departing from the spirit and scope of the invention.

What is claimed is:

1. An apparatus for vector-quantizing an image signal, comprising:
   a four-band linear filter para-unitary (LPPU) filter group for transforming an input image signal into transform coefficients which are represented by 4×4 frequency bands;
   a code modulator for differential-pulse-code-modulating a direct current (DC) component of said transform coefficients output from said four-band LPPU filter group into differential pulse codes;
   a coefficient extractor for extracting a predetermined number of only low-frequency alternating current (AC) component coefficients from said transform coefficients output from said four-band LPPU filter group;
   a classifier for determining a class from a plurality of predetermined classes using only said low-frequency AC component coefficients extracted by said coefficient extractor, and for outputting class information representing said class;
   a classified vector quantizer for quantizing classified vectors of corresponding AC component coefficients input from said coefficient extractor according to said class information output from said classifier; and
   a multiplexer for multiplexing said differential pulse codes output from said code modulator, classified-vector-quantized image data output from said classified vector quantizer, and said class information output from said classifier, and for outputting a multiplexed result.

2. The apparatus according to claim 1, wherein said four-band LPPU filter group comprises thirty-two taps.

3. The apparatus according to claim 1, wherein said four-band LPPU filter group is arranged to supply only said DC component coefficient to said code modulator, and to supply corresponding AC component coefficients to said coefficient extractor.

4. The apparatus according to claim 1, wherein said code modulator is arranged to differential-pulse-code-modulate said DC component coefficient two-dimensionally.

5. The apparatus according to claim 1, wherein said coefficient extractor is arranged to supply an AC component coefficient having a minimum horizontal frequency and an AC component coefficient having a minimum vertical frequency to said classifier and to supply said predetermined number of said low-frequency AC component coefficients to said classified vector quantizer.

6. The apparatus according to claim 5, wherein said low-frequency AC component coefficients extracted by said coefficient extractor comprise five AC component coefficients having respective frequencies which are close to a frequency of said DC component.

7. The apparatus according to claim 5, wherein said classifier is arranged to determine a representative feature vector which is closest to a feature vector corresponding to said AC component coefficients supplied from said coefficient extractor, from a plurality of predetermined representative feature vectors, and to output said class information representing said class corresponding to said representative feature vector, wherein said feature vector comprises said AC component coefficient having said minimum horizontal frequency as a horizontal component and said AC component coefficient having said minimum vertical frequency as a vertical component.

8. The apparatus according to claim 7, wherein said plurality of predetermined representative feature vectors are determined according to an edge degree and an edge direction of an image in a two-dimensional feature vector region.

9. The apparatus according to claim 8, wherein said plurality of representative feature vectors are determined using a Linde-Buzo-Gray algorithm.

10. The apparatus according to claim 6, wherein said classified vector quantizer is arranged to perform a vector quantization operation by using a quantization vector which is represented by two AC components whose frequencies are close to said frequency of said DC component, and a quantization vector which is represented by three AC components whose frequencies are farther from said frequency of said DC component than said respective frequencies of said two AC components.

11. The apparatus according to claim 1, wherein said multiplexer is arranged to perform a multiplexing operation so that class information representing a particular class is not output, wherein said particular class is most frequently generated by said classifier.

12. The apparatus according to claim 1, further comprising means for variable-length-encoding said differential pulse codes output from said code modulator and for supplying variable-length-encoded data to said multiplexer.

13. The apparatus according to claim 1, further comprising means for variable-length-encoding classified-vector-quantized data output from said classified vector quantizer and for supplying variable-length-encoded data to said multiplexer.

14. An apparatus for vector-quantizing an image signal, comprising:
   a four-band linear filter para-unitary (LPPU) filter group for transforming an input image signal into transform coefficients which are represented by 4×4 frequency bands;
   a code modulator for differential-pulse-code-modulating a direct current (DC) component of said transform coefficients output from said four-band LPPU filter group into differential pulse codes;
   a coefficient extractor for extracting a predetermined number of low-frequency alternating current (AC) component coefficients from said transform coefficients output from said four-band LPPU filter group;
   a classifier for determining a class from a plurality of predetermined classes using said low-frequency AC component coefficients extracted by said coefficient extractor, and for outputting class information representing said class; and
   a classified vector quantizer for quantizing classified vectors of corresponding AC component coefficients input from said coefficient extractor according to said class information output from said classifier, for outputting block position information, in an image block having a predetermined size, of a block matching said transform coefficients transformed by said four-band LPPU filter group, together with classified-vector-quantized image data and said class information, when said class information does not represent a particular class among said plurality of predetermined classes, and for outputting said classified-vector-quantized image data and said class information when said class information represents said particular class.

15. The apparatus according to claim 14, wherein said four-band LPPU filter group comprises thirty-two taps.

16. The apparatus according to claim 14, wherein said four-band LPPU filter group is arranged to supply only said DC component coefficient to said code modulator and to supply corresponding AC component coefficients to said coefficient extractor.

17. The apparatus according to claim 14, wherein said code modulator is arranged to differential-pulse-code-modulate said DC component coefficient two-dimensionally.

18. The apparatus according to claim 14, wherein said coefficient extractor is arranged to supply an AC component coefficient having a minimum horizontal frequency and an AC component coefficient having a minimum vertical frequency to said classifier and to supply said predetermined number of said low-frequency AC component coefficients to said classified vector quantizer.

19. The apparatus according to claim 18, wherein said low-frequency AC component coefficients extracted by said coefficient extractor comprise five AC component coefficients whose respective frequencies are close to a frequency of said DC component.

20. The apparatus according to claim 18, wherein said classifier is arranged to determine a representative feature vector which is closest to a feature vector corresponding to said AC component coefficients supplied from said coefficient extraction means, from a plurality of predetermined representative feature vectors, and to output said class information representing said class corresponding to said representative feature vector, wherein said feature vector comprises said AC component coefficient having said minimum horizontal frequency as a horizontal component and said AC component coefficient having said minimum vertical frequency as a vertical component.

21. The apparatus according to claim 20, wherein said plurality of predetermined representative feature vectors are determined in accordance with an edge degree and an edge direction of an image in the two-dimensional feature vector region.

22. The apparatus according to claim 20, wherein said plurality of the representative feature vectors are determined using a Linde-Buzo-Gray algorithm.

23. The apparatus according to claim 19, wherein said classified vector quantizer is arranged to perform a vector quantization operation by using a quantization vector which is represented by two AC components whose respective frequencies are close to said frequency of said DC component, and a quantization vector which is represented by three AC components whose respective frequencies are farther from that of said DC component than said respective frequencies of said two AC components.

24. The apparatus according to claim 14, wherein said particular class is most frequently generated by said classifier.

25. The apparatus according to claim 14, wherein said four-band LPPU filter group is arranged to generate an image block comprising 32×32 pixels.

26. The apparatus according to claim 25, wherein said classified vector quantizer is arranged to perform a quad-tree technique to determine block position information.

27. The apparatus according to claim 14, further comprising means for variable-length-encoding said differential pulse codes output from said code modulator.

28. The apparatus according to claim 14, further comprising means for variable-length-encoding said classified-vector-quantized data output from said classified vector quantizer.

29. A method for vector-quantizing an image signal, comprising the steps of:

transforming an input image signal into transform coefficients which are represented by 4×4 frequency bands;

differential-pulse-code-modulating a direct current (DC) component of said transform coefficients into differential pulse codes;

extracting a predetermined number of only low-frequency alternating current (AC) component coefficients from said transform coefficients;

determining a class from a plurality of predetermined classes using only said low-frequency AC component coefficients;

outputting class information representing said class; and quantizing classified vectors of corresponding AC component coefficients according to said class information to generate classified-vector-quantized image data.

30. The method according to claim 29, further comprising the steps of:

multiplexing said differential pulse codes, classified-vector-quantized image data, and said class information; and outputting a multiplexed result.

31. The method according to claim 29, wherein said transforming step comprises the step of supplying only said DC component coefficient to a code modulator, and supplying corresponding AC component coefficients to a coefficient extractor.

32. The method according to claim 29, wherein said step of differential-pulse-code-modulating said DC component coefficient comprises the step of two-dimensionally differential-pulse-code-modulating, said DC component coefficient.

33. The method according to claim 29, wherein said extracting step comprises the steps of:

supplying an AC component coefficient having a minimum horizontal frequency and an AC component coefficient having a minimum vertical frequency to a classifier; and supplying said predetermined number of said low-frequency AC component coefficients to a classified vector quantizer.

34. The method according to claim 33, wherein said classifying step comprises the steps of:

determining a representative feature vector, which is closest to a feature vector corresponding to said AC component coefficients, from a plurality of predetermined representative feature vectors; and outputting said class information representing said class corresponding to said representative feature vector, wherein said feature vector comprises said AC component coefficient having said minimum horizontal frequency as a horizontal component and said AC component coefficient having said minimum vertical frequency as a vertical component.

35. The method according to claim 34, further comprising, the step of:

determining said plurality of predetermined representative feature vectors according to an edge degree and an edge direction of an image in a two-dimensional feature vector region.

36. The method according to claim 35, wherein said determining step comprises the step of determining said plurality of representative feature vectors using a Linde-Buzo-Gray algorithm.

37. The method according to claim 29, wherein said classified vector quantizing step comprises the steps of:

performing a vector quantization operation using a quantization vector which is represented by two AC components whose frequencies are close to said frequency of said DC component, and a quantization vector which is represented by three AC components whose frequencies are farther from said frequency of said DC component than said respective frequencies of said two AC components.

38. The method according to claim 29, further comprising the steps of:

variable-length-encoding said differential pulse codes.

39. The method according to claim 29, further comprising the steps of:

variable-length-encoding said classified-vector-quantized data.

* * * * *